Dec. 12, 1967     I. DORMAN     3,357,121

SUSPENSION TYPE LOCK-IN APERTURE CARD

Filed Oct. 21, 1965

INVENTOR.
ISIDORE DORMAN
BY
ATTORNEY

United States Patent Office 3,357,121
Patented Dec. 12, 1967

3,357,121
SUSPENSION TYPE LOCK-IN APERTURE CARD
Isidore Dorman, Whitestone, N.Y., assignor to NB Jackets Corporation, Long Island City, N.Y., a corporation of New York
Filed Oct. 21, 1965, Ser. No. 500,015
3 Claims. (Cl. 40—158)

ABSTRACT OF THE DISCLOSURE

A suspension-type lock-in aperture card having a rectangular aperture for accommodating a film slide, the aperture being enclosed by top and bottom panels of transparent material adhesively bonded to the edges of the aperture, the end border of the top panel having an adhesive-free triangular area whose apex is contiguous with the aperture to admit the triangular tip of a tool for raising this end border to provide an entrance for the film slide.

---

This invention relates generally to aperture cards for mounting microfilm slides and the like, and more particularly to an improved aperture card for suspending a slide within the aperture chamber thereof without adhesive, and for locking the slide therein.

Card record systems are known wherein microfilms mounted on cards are stored in a filing system adapted to index, classify and sort the film, whereby a desired film may be selected for optical projection or for photographic reproduction. For example, engineering drawings may be reduced to microfilm and stored in such card systems, the drawings being selectively available for inspection. The films may be mounted in cards perforated for use in conjunction with sorting and classifying punch card machines of the standard types. Such machines function to arrange the cards in accordance with the location of the perforations, so that the cards may later be processed to select those which contain film frames having the desired subject matter. In other instances, the films may be mounted on cards forming part of an alphabetically arranged index or any other coded form of filing system.

One well known type of record card for mounting film takes the form of a card having an aperture covered by a transparent carrier sheet of adhesive material to which a film may be attached. To protect the adhesive sheet from exposure so that the cards do not stick to each other, the adhesive sheet is covered temporarily by a cover sheet. Therefore, in order to apply the film, the cover sheet must be stripped off and the film substituted therefor.

Cards of this type are inconvenient to handle. Moreover, the optical properties of the adhesive serving to bond the film to the transparent sheet are such as to interfere somewhat with the clarity of the projection, particularly when chemical changes occur in the adhesive as a result of aging. Another disadvantage of such prior-art structures is that since the film is adhesively secured to the card, its later removal for insertion in another card or for some other purpose, is made difficult.

In the prior Engelstein patent 2,843,955, issued July 22, 1948, there is disclosed a suspension-type aperture card wherein the slide or transparency, rather than being permanently adhered to a carrier sheet, is suspended therein between two transparent panels disposed on either side of the card and secured to the edges of the aperture. The two panels form a protective jacket for the slide, the jacket being loaded simply by inserting the film into a side opening.

In recent years it has become the practice to make suspension-type cards with transparent top and bottom panels marginally secured to the edges of the aperture, except for one end of the front panel which is left free of adhesive to provide an entrance for the aperture chamber. In order to maintain the film transparency or slide at a fixed position within the chamber, particularly when the dimensions of the chip were smaller than those of the chamber, adhesive dots or similar expedients are provided within the chamber to hold the slide inserted therein and to prevent dislodgement thereof from the chamber.

The drawback to the use of adhesive dots or similar expedients, is that it interferes in some instances with the insertion of the slide into the chamber, for the dots are positioned in the slide path of the slide. Moreover, it makes later removal of the slide from the chamber more difficult. In addition, since the aperture chamber has an entrance which remains open, dirt, dust and moisture tend to penetrate the chamber in which the cards are being stored, even before they are loaded. The presence of foreign matter and moisture degrades the quality of the film in projection and reproduction.

Accordingly, it is the primary object of this invention to provide an improved suspension-type aperture card wherein the transparent panels act to suspend the transparency or any other inserted element within the aperture chamber and to lock the element within the chamber, whereby the element is sealed therein, and yet may later be removed without difficulty.

A significant feature of the invention resides in the fact that the chamber is free of adhesive dots or other expedients which interfere with the free insertion of the slide, and yet the slide is securely locked therein.

More specifically, it is an object of the invention to provide a suspension-type, lock-in aperture card wherein transparent top and bottom panels are marginally secured by pressure-sensitive adhesive at both their sides and ends to the edges of the aperture, the adhesive applied to the front end of the top panel having an adhesive-free notch therein whereby this end may readily be lifted by a tool receivable in the notch from the related edge of the aperture to provide a temporary opening into the aperture chamber, the raised end, after the element is inserted through the opening, being then pressed down to adhere to the edge of the aperture, thereby sealing the element within the chamber.

Also an object of the invention is to provide a lock-in suspension-type aperture card which may be manufactured and sold at relatively low cost.

For a better understanding of the invention, as well as other objects and further features thereof, reference is made to the following detailed description to be read in conjunction with the accompanying drawing, wherein.

Figure 1:
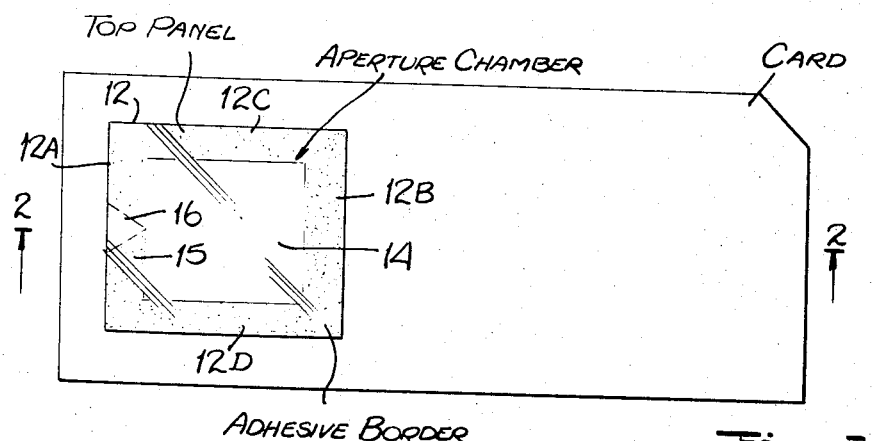
FIG. 1 is a plan view of a suspension-type lock-in aperture card in accordance with the invention.
Figure 2:
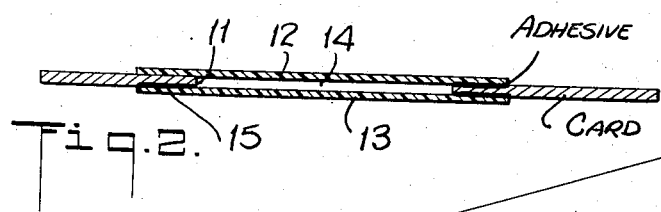
FIG. 2 is a longitudinal section taken in the plane indicated by line 2—2 in FIG. 1.

Referring now to the figures, there is shown a standard card 10, designed for use in commercially available filing systems and in punched-card classifying and sorting machines. The card may be provided with printed indicia or with rows of punches or other code symbols identifying the film slide or other element mounted in an aperture 11 disposed adjacent the front end of the card. The card may be of single or multiple-ply material in any desired thickness, such as 6 to 8 mils, and the aperture or window may be rectangular or square with dimensions appropriate to the film slide or other element to be placed therein.

Covering the top of the aperture is a transparent, rectangular panel 12 of very thin flexible material such as acetate, polyester, or vinyl sheeting, the dimensions of the panel being greater than that of the aperture to define end borders 12A and 12B and side borders 12C and 12D which overlie the respective edges of the apertures. Covering the bottom of the aperture is an identical panel 13, the space enclosed by the top and bottom panels constituting an aperture chamber 14 for accommodating a slide or similar element.

The borders 12A, 12B, 12C and 12D of the top panel are bonded to the corresponding edges of the aperture by a frame-shaped layer 15 of adhesive material having an adhesive-free notch 16 therein. Notch 16 is in the form of a triangle centrally disposed in the front end border 12A, the apex of the notch being contiguous with the aperture. The adhesive is of a pressure-sensitive type suitable for bonding the panel material to the card, the purpose of this notch being to facilitate the insertion of a wedge-shaped tool to raise the front end border 12A from the card. All of the corresponding borders of the bottom panel 13 are bonded to the edge of the aperture to fully enclose the bottom face of the aperture 11.

Figure 3:
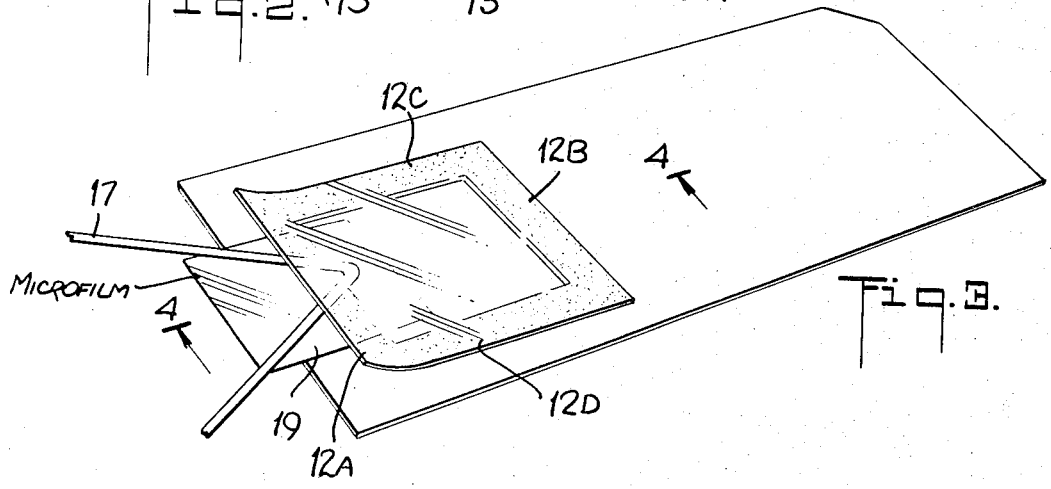
FIG. 3 shows in perspective how a temporary opening is made in the aperture chamber to permit entry of a slide therein.
Figure 4:
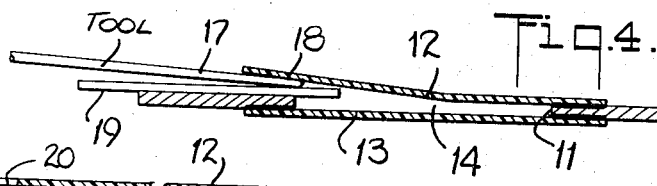
FIG. 4 is a longitudinal section taken in the plane indicated by line 4—4 in FIG. 3.

As shown in FIG. 3, in order to provide a temporary entrance into aperture chamber 14, a wedge-shaped or triangular tool 17 is inserted into the chamber with its point 18 directed into the notch 16. When the tool is pushed toward the aperture it acts to delaminate end border 12A of the top panel from the related edge of the card. It then becomes possible to feed a slide 19 or other element into the aperture chamber through the temporary opening created by the tool, the slide being inserted under the tool. In practice, the tool may take the form of a wire bent into a triangle.

The dimensions of the slide preferably are slightly smaller than those of the aperture, so that when the slide is inserted it is seated snugly within the aperture chamber. When the slide occupies its proper position within the chamber, the chamber may be sealed simply by pressing down on the panel end border 12A. In practice, this pressure need not be applied in a separate operation, for when stacking the cards, the pressure imposed by the stacked cards is sufficient to effect the desired closure.

Thus the slides are sealed within the aperture chamber and the slides cannot be dislodged therefrom, nor can dirt or moisture enter the chamber. This feature is important for when conventional aperture cards are in use for prolonged periods in humid or polluted environments, the film therein is clouded by particles or moisture penetrating the chamber. When the aperture card is placed in an optical viewer, the clear image thereon may be projected without interference.

Figures 5, 6:
FIG. 5 shows in section the slide locked-in into the aperture chamber.
FIG. 6 is a modified form of card, shown in section.

In the modification shown in FIG. 6, the aperture card of the same basic type as shown, except that the panels 12 and 13 are seated within depressed shoulders bordering the aperture so that the surfaces of the panels do not project above the plane of the card. Hence such cards lie perfectly flat, and when stacked, filed or otherwise handled, one card does not catch on another to interfere with processing operations. In this embodiment, it is necessary to provide on the card, in addition to the depressed shoulders, a wedge-shaped depression 20 which extends toward the front end of the card and is aligned with notch 16 so that the tool 17 may readily be inserted in the notch which lies below the surface of the card.

In lieu of an adhesive-free notch 16 to facilitate opening of the aperture chamber, the end border 12A may take the form of adhesive dots or areas with a central spacing therebetween to admit the tool 17.

While there have been shown and described preferred embodiments of suspension-type lock-in aperture card in accordance with the invention, it will be appreciated that many changes and modifications may be made therein without, however, departing from the essential spirit of the invention as defined in the annexed claims.

What I claim is:

1. A suspension-type lock-in aperture card comprising a card having a rectangular aperture, transparent top and bottom panels formed of flexible sheet material disposed on opposing faces of said aperture to form a chamber, said panels having dimensions larger than that of said aperture to define marginal end and side borders overlying the edges of said aperture, and means adhering all of the borders of said panels to card edges, the end border of said top panel having an adhesive-free triangular area therein to admit a tool having a triangular tip for raising said end border to provide an opening for inserting a film strip in said chamber, the apex of said triangular area being contiguous with said aperture whereby when said end border is adhered to said card edge, said strip is effectively sealed within said chamber.

2. A card, as set forth in claim 1, wherein said edges of said aperture are depressed to form shoulders for accommodating the borders of said panels whereby the panels lie flush with the surface of the card, and further including a depression communicating with the depressed end edge of said aperture relative to said end border to permit the insertion of said tool into said adhesive-free area.

3. The method of loading a suspension-type lock-in aperture card having top and bottom panels marginal adhered to the edges of the aperture to define a chamber, one end margin of the top panel having pressure-sensitive adhesive thereon with an adhesive-free region having a triangular configuration whose apex is contiguous with said aperture, said method comprising the steps of inserting of tool having a triangular tip between said end margin and the related edge of the card into said adhesive-free region to raise said end margin to force an entrance into said chamber, feeding a film slide through said entrance into said chamber, and pressing down the raised end margin to seal said chip in said chamber.

References Cited

UNITED STATES PATENTS

| | | | |
|---|---|---|---|
| 3,197,905 | 8/1965 | Witte et al. | 40—158 |
| 3,292,292 | 12/1966 | Engelstein | 40—158 |
| 3,293,786 | 12/1966 | Anderson | 40—159 |

EUGENE R. CAPOZIO, *Primary Examiner.*

W. J. CONTRERAS, *Assistant Examiner.*